(12) United States Patent
Bertram et al.

(10) Patent No.: US 7,607,088 B2
(45) Date of Patent: Oct. 20, 2009

(54) COMPUTER PROGRAM PRODUCT, APPARATUS AND METHOD FOR DISPLAYING A PLURALITY OF ENTITIES IN A TOOLTIP FOR A CELL OF A TABLE

(75) Inventors: Randal Lee Bertram, Raleigh, NC (US); Aaron Roger Cox, Tucson, AZ (US); Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 11/407,741

(22) Filed: Apr. 18, 2006

(65) Prior Publication Data

US 2007/0245241 A1    Oct. 18, 2007

(51) Int. Cl.
*G06F 3/00* (2006.01)
*G06F 17/00* (2006.01)

(52) U.S. Cl. .............. 715/711; 715/212; 715/705; 715/708; 715/780; 715/856

(58) Field of Classification Search .......... 715/711, 715/862
See application file for complete search history.

(56) References Cited

U.S. PATENT DOCUMENTS

| | | | |
|---|---|---|---|
| 5,500,936 A | 3/1996 | Allen et al. | 395/156 |
| 5,721,847 A | 2/1998 | Johnson | 395/333 |
| 5,825,355 A * | 10/1998 | Palmer et al. | 715/712 |
| 6,594,696 B1 * | 7/2003 | Walker et al. | 709/223 |
| 6,771,284 B1 * | 8/2004 | Anderson et al. | 715/705 |
| 2002/0040475 A1 | 4/2002 | Yap et al. | 725/39 |
| 2002/0091728 A1 | 7/2002 | Kjaer et al. | 707/503 |
| 2003/0142123 A1 * | 7/2003 | Malamud et al. | 345/715 |
| 2004/0085367 A1 | 5/2004 | Hagarty, Jr. | 345/854 |
| 2005/0050470 A1 * | 3/2005 | Hudson et al. | 715/711 |
| 2005/0114779 A1 * | 5/2005 | Griesmer | 715/711 |
| 2005/0183002 A1 | 8/2005 | Chapus | 715/505 |

FOREIGN PATENT DOCUMENTS

| | | |
|---|---|---|
| JP | 2005 020354 A | 1/2005 |
| WO | WO 98/12872 | 3/1998 |

* cited by examiner

*Primary Examiner*—Kieu Vu
*Assistant Examiner*—Yongjia Pan
(74) *Attorney, Agent, or Firm*—Harrington & Smith, PC (57) ABSTRACT

A computer program product, electronic device and method are provided that enable a user to easily view, in a tooltip, all of the entities of a plurality of entities contained in a cell of a table when the width of the cell prevents the cell display from showing all of the entities. In response to a tooltip being opened for a cell of a table, the cell having a plurality of entities, at least a portion of the plurality of entities is displayed in the tooltip. An indicia expressive of a total number of the plurality of entities is also displayed. Alternate embodiments provide navigation aids in the tooltip to assist a user in more conveniently viewing all of the entities.

16 Claims, 8 Drawing Sheets

COMPUTER PROGRAM PRODUCT, APPARATUS AND METHOD FOR DISPLAYING A PLURALITY OF ENTITIES IN A TOOLTIP FOR A CELL OF A TABLE

TECHNICAL FIELD

The teachings in accordance with the exemplary embodiments of this invention relate generally to computer systems and software and, more specifically, relate to computer systems and software for displaying tables.

BACKGROUND

Tables are typically employed by computer software to present a user with information in a format that is easily visible and organized. Tables consist of one or more cells, usually organized in rows and columns, with each cell capable of retaining and displaying information. When a table has many columns, the information capable of being displayed by a cell in the cell display may be restricted by the width of the cell. In such cases, the information displayed may be truncated. This truncation is often indicated by a set of ellipsis, commonly taking the form of three periods in a row (" . . . ") inserted at the end of the information that the cell shows. In some computer software, when a pointer hovers over a truncated cell display a tooltip opens. Such a tooltip usually shows all of the contents of the cell if the contents can fit in the tooltip (i.e. if the tooltip is large enough to show all of the contents).

Figure 1:
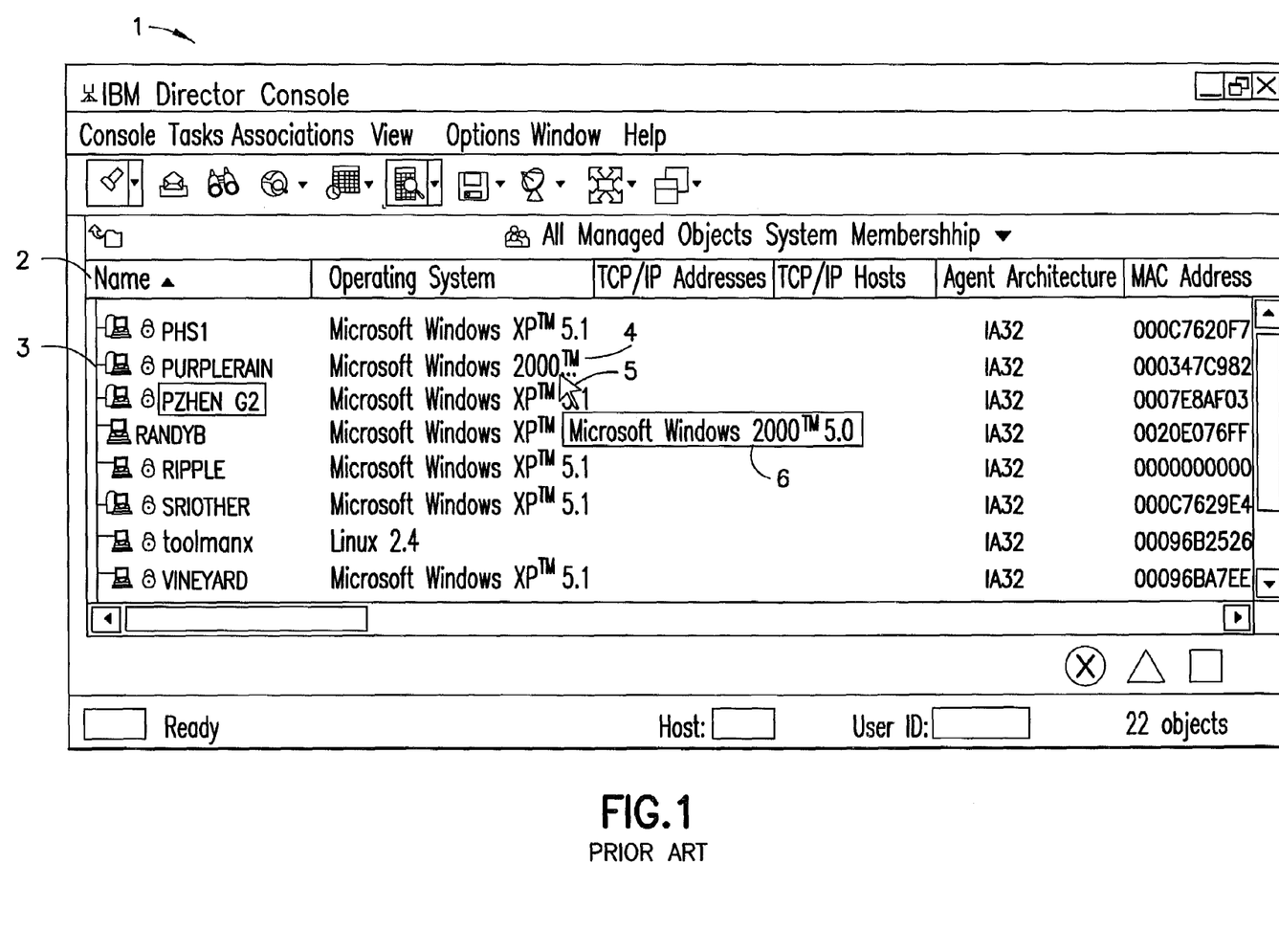
FIG. 1 shows an exemplary conventional console wherein the console contains a table in which various information is shown for systems on a network.

FIG. 1 shows an exemplary conventional console 1. The console 1 contains a table 2 in which various information is shown for systems on a network. For the PURPLERAIN system, whose information is provided in a row 3, one can observe a cell 4 that contains Operating System information for this system. The Operating System information for PURPLERAIN is too long to be fully shown in the cell display and is thus truncated. This is indicated by the ellipsis at the end of the truncated information that is shown. However, a pointer 5 is hovering over the truncated cell display and a tooltip 6 has opened. The tooltip 6 displays the full Operating System information that the cell contains. In some conventional systems, the tooltip disappears when a user moves the pointer such that it no longer hovers over the cell display.

SUMMARY

In an exemplary aspect of the invention, a computer program product is provided. The computer program product comprises program instructions embodied on a tangible computer-readable medium, whereby execution of the program instructions results in a series of operations. The series of operations comprise: in response to a tooltip being opened for a cell of a table, the cell comprising a plurality of entities, displaying in the tooltip at least a portion of the plurality of entities; and displaying in the tooltip an indicia expressive of a total number of the plurality of entities.

In another exemplary aspect of the invention, an electronic device is provided. The electronic device comprises: at least one memory; and at least one data processor coupled to the at least one memory. The at least one data processor is operable to perform operations comprising: in response to a tooltip being opened for a cell of a table, the cell comprising a plurality of entities, displaying in the tooltip at least a portion of the plurality of entities; and displaying in the tooltip an indicia expressive of a total number of the plurality of entities.

In a further exemplary aspect of the invention, a computer program product is provided. The computer program product comprises program instructions embodied on a tangible computer-readable medium, whereby execution of the program instructions results in a series of operations. The series of operations comprise: in response to a tooltip being opened for a cell of a table, the cell comprising a plurality of entities, displaying in the tooltip at least a portion of the plurality of entities; and providing at least one navigation aid to assist a user in navigating among the at least a portion of the plurality of entities displayed in the tooltip.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

As used herein, the term "cell display" refers to what is shown in the given cell on the display. Depending on the particular software or system, the cell display can show a variety of different items, such as the entire cell contents, a portion of the cell contents, or none of the cell contents, as non-limiting examples. The contents of the cell refers to the information (e.g. data) that is stored (e.g. contained) within the cell. As used herein, an entity is a discrete item contained in a cell. As non-limiting examples, an entity may comprise a number, text, an equation or a graphic. As used herein, the opening of a tooltip refers to a tooltip being displayed in response to a given interaction occurring between a user and the system. A tooltip may be opened in response to a given keystroke combination or a mouse-over event, as non-limiting examples.

Conventional systems prove problematic when a cell contains a plurality of entities. As shown in FIG. 1, the information contained in the cell 4 is a single entity, namely a relatively short string of characters. In such a case, the tooltip 6 can readily handle displaying all of the information contained in the cell.

In a conventional system, when a cell contains a plurality of entities the cell display shows either the first entity followed by an ellipsis or some of the entities up to a certain limit. This limit often takes the form of a set maximum number of entities or characters. If all of the entities are not shown in the cell display, a user may be able to see all of the entities by opening a separate dialogue. An example of this is opening the Properties dialogue for a system of FIG. 1 that has a plurality of entities in one of its cells. If all of the entities are not shown in the cell display, a user may also utilize a tooltip to further view the contents of a cell. In some systems known to the inventors, prior art tooltips for cells containing a plurality of entities either show all of the entities (if the tooltip is large enough to show all of the entities, e.g. for a short list of entities) or the first few entities followed by an ellipsis (when the tooltip is not large enough to show all of the entities, e.g. for a long list of entities).

Figure 2:
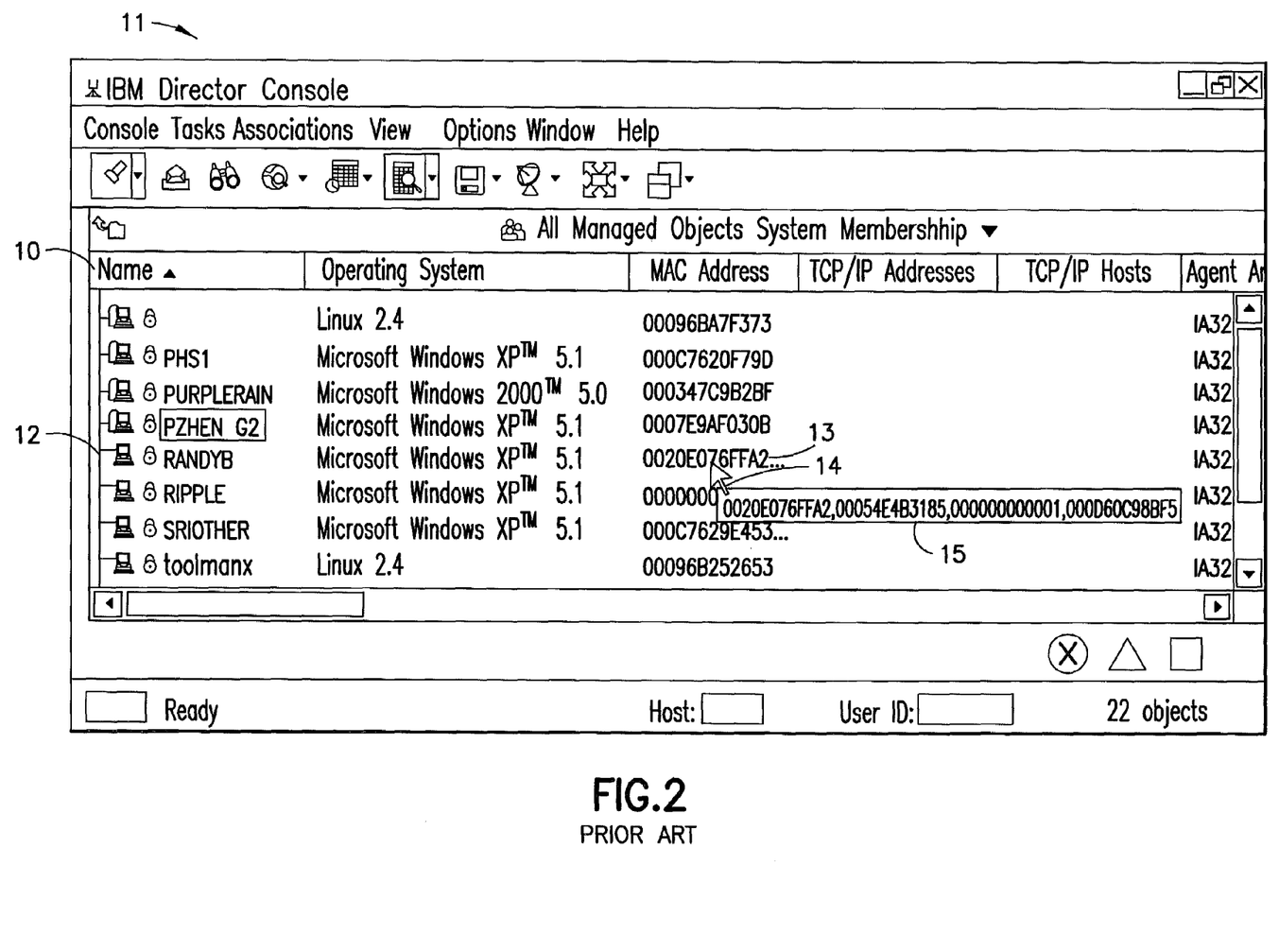
FIG. 2 shows a conventional table in which a tooltip is open for a cell containing a plurality of entities.

Referring to FIG. 2, a conventional table 10 is shown in which a tooltip is open for a cell containing a plurality of entities. The table 10 is located in a console 11 that shows information for systems on a network. For a RANDYB system, whose information is provided in a row 12, one can observe a cell 13 that contains MAC Address information for this system. The MAC Address information for RANDYB is too long to be fully shown in the cell display and is thus truncated. This is indicated by the ellipsis at the end of the truncated information that is shown. However, a pointer 14 is hovering over the truncated cell display and a tooltip 15 has opened. The tooltip 15 displays the full MAC Address information that the cell contains. In this example, RANDYB has four MAC Addresses. All four of these MAC Addresses are shown in the tooltip 15 with each MAC Address separated from the following one by a semicolon (";"). In the cell 13 of FIG. 2, since there are only four entities and each entity consists of twelve characters, the tooltip is capable of showing all four entities.

In a conventional tooltip for a cell containing a plurality of entities, if the tooltip is incapable of showing all of the contents of the cell, the tooltip will typically show the first few entities followed by an ellipsis. Thus, a user using a conventional system may not be able to view, in a tooltip, all of the entities in a cell containing a plurality of entities. This is especially true for cells containing a large number of entities, where the total length of the contents of the cell prohibits a tooltip from showing all of the contents.

It would therefore be desirable to provide techniques that enable a user to easily view, in a tooltip, all of the entities contained in a cell when the width of the cell prevents the cell display from showing all of the entities. Furthermore, it would be advantageous to provide navigation aids in the tooltip to assist a user in more conveniently viewing all of the entities, particularly when the cell contains a large number of entities.

Figure 3:
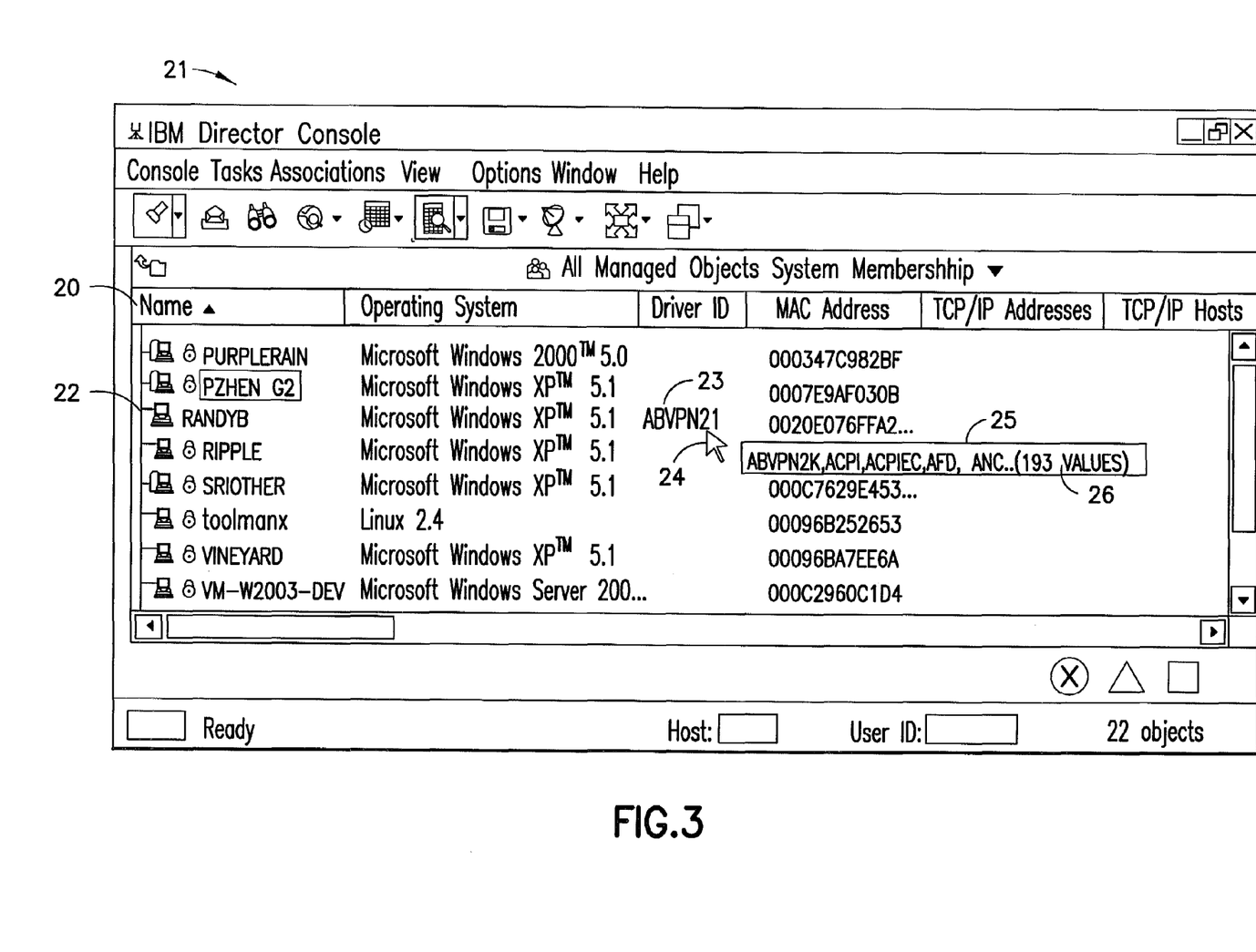
FIG. 3 depicts a table incorporating aspects of the invention.

FIG. 3 depicts a table 20 incorporating aspects of the invention. In the exemplary embodiment of FIG. 3, the table 20 is located in a console 21 that shows information for systems on a network. In other embodiments, the table may be located in different software or independently of other software. In still other embodiments, the information contained in and displayed by the table may comprise information other than that relating to systems on a network. In additional embodiments, the information contained in and displayed by the table may not be presented in English. The information may be presented using different alphanumeric text or foreign language text, as non-limiting examples.

The table 20 presents various information for systems on a network. Information for a RANDYB system is provided in a row 22. One of the cells 23 contains Driver ID information for the RANDYB system. The Driver ID information comprises a number of entities and is too long to be fully displayed in the cell display, as indicated by the ellipsis at the end of the truncated information shown in the cell display. A pointer 24 is hovering over the cell 23 and a tooltip 25 has opened. The tooltip 25 shows additional information, in the form of entities, that cannot otherwise be shown in the truncated cell display.

In the tooltip 25 shown in FIG. 3, an indicia expressive of a total number of entities 26 is displayed. As can be observed, there are 193 entities in the Driver ID cell 23 for the RANDYB system. Although referred to in FIG. 3 as values, an entity of a cell need not comprise a value. The indicia can be a number, as in FIG. 3, or words, as non-limiting examples.

In this exemplary embodiment, due to the large number of entities in the cell 23, even the tooltip 25 is unable to display all of the entities at once. In other exemplary embodiments of the invention, the tooltip may be capable of displaying all of the entities in a cell. As a non-limiting example, the tooltip could comprise multiple lines such that all of the entities can be viewed at one time.

Alternate embodiments may show different items in the cell display when the cell contains a plurality of entities and the cell contents are too long to display all of the contents in the cell display. As a non-limiting example, the cell display may show a symbol (e.g. an ellipsis marking) indicating that the cell contents are too long to display all of the contents in the cell display.

Figure 4:
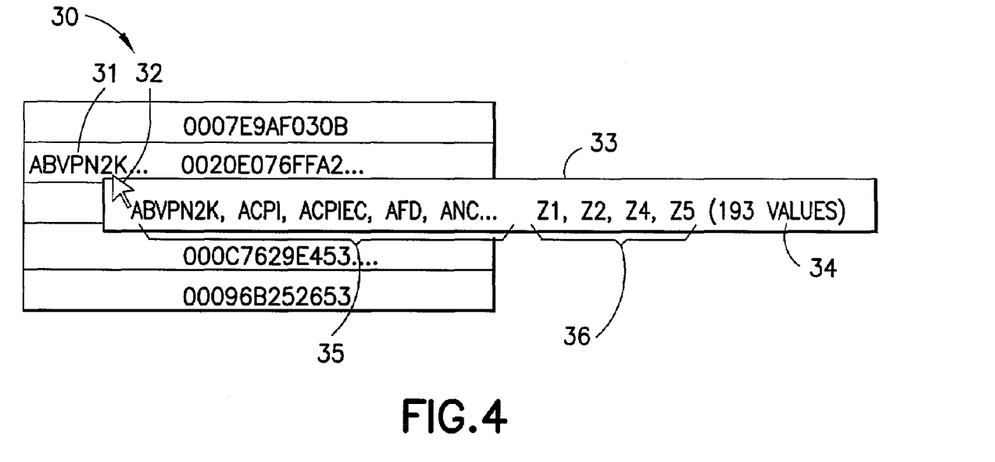
FIGS. 4-6 show a portion of a table illustrating another exemplary embodiment of the invention.
Figure 5:
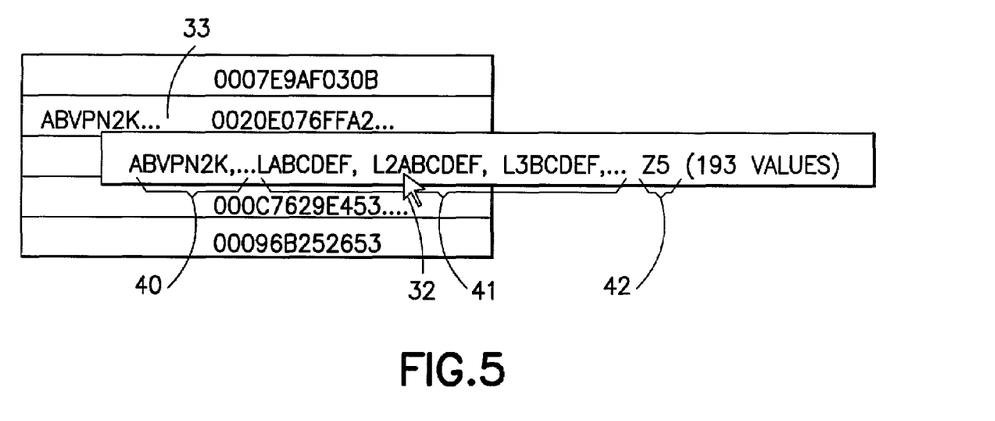
Figure 6:
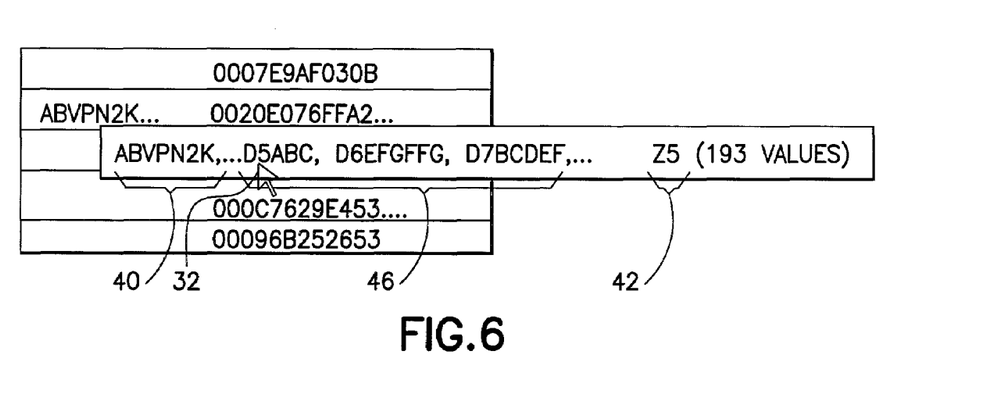

FIGS. 4-6 show a portion of a table 30 illustrating another exemplary embodiment of the invention. Referring to FIG. 4, the table 30 has a cell 31 containing a plurality of entities. A pointer 32 is hovering over the cell 31 and a tooltip 33 has opened. As in the embodiment of FIG. 3, the tooltip 33 shows a total number of entities 34, indicating that the cell 31 contains 193 entities. The tooltip 33 of FIGS. 4-6 is enabled to not disappear when a user moves the pointer 32 such that the pointer 32 no longer hovers over the cell display.

As can be observed, the tooltip 33 of FIG. 4 is displaying two sub-groups 35, 36 of the 193 entities, namely the first five entities in a first sub-group 35 and the last four entities in a second sub-group 36 with an ellipsis separating the two sub-groups 35, 36. Alternate embodiments may have the sub-groups show a different numbers of entities. As non-limiting examples, a sub-group could display three entities or only one entity. Other exemplary embodiments may have the tooltip display different numbers of sub-groups. As a non-limiting example, the tooltip could display three sub-groups of the entities contained in the cell with each sub-group separated by an ellipsis. Although the entities in the cell 31 of FIG. 4 are ordered alphabetically, further exemplary embodiments may not have the entities sorted according to one or more rules. That is, the entities may be unordered except for a relative arrangement (e.g. first listed entity, second listed entity, and so on through the last listed entity).

As used herein, the phrase "the entity listing" refers to a list of the entities in the cell according to a relative arrangement. The entity listing may further comprise a sorted arrangement wherein the entities are sorted according to one or more rules. A non-limiting example of a sorted arrangement is a series of textual entities sorted alphabetically (e.g. from a to z in English).

In FIG. 5, a user has moved the pointer 32 in order to interact with the tooltip 33. The tooltip 33 now displays three sub-groups 40, 41, 42. The middle sub-group 41 is adapted to show different entities based on the relative horizontal position of the pointer 32 in the cell 31. In FIG. 5, the pointer is roughly in the middle of the tooltip 33. Hence, the middle sub-group 41 displays entities from the approximate middle of the entity listing. In such a manner, the tooltip 33 is enabled to scroll through the entity listing and display any of the entities in the entity listing.

In FIG. 6, a user has moved the pointer 32 towards the left of the position of the pointer 32 in FIG. 5. In so doing, an earlier portion of the entity listing is shown in the middle sub-group 46, as corresponds to the more leftward position of the pointer 32 in the tooltip 33.

Although described in FIGS. 5 and 6 with respect to horizontal movement, alternate embodiments may utilize different movements, actions and/or relative locations of the pointer in determining which portion of the entity listing is shown in the middle sub-group. As a non-limiting example, since some foreign languages are read from right to left instead of left to right, moving a pointer to the rightward side of the tooltip may have the middle sub-group display entities from an earlier portion of the entity listing. As noted above with respect to FIG. 4, other exemplary embodiments may have the tooltip display and/or utilize different numbers of sub-groups. Further exemplary embodiments may utilize a different sub-group, other than a middle sub-group, for displaying a variable portion of the entity listing. Other embodiments may utilize a different mechanism, other than pointer position, for enabling a user to view different portions of the entity listing. As a non-limiting example, scroll bars and arrows could be employed to vary the portion of the entity listing shown in the middle sub-group according to the scroll bar position.

Figure 7:
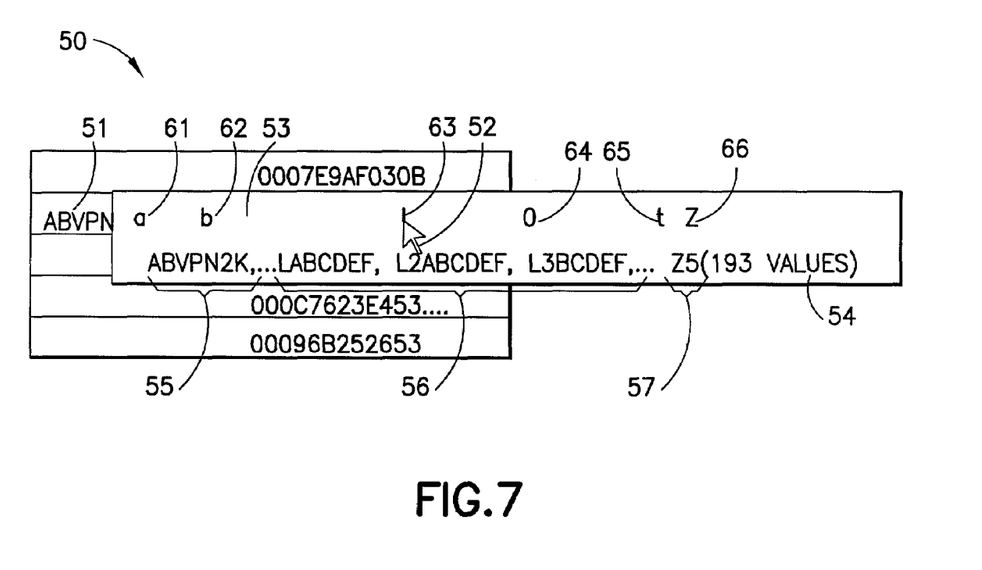
FIG. 7 shows a portion of a table illustrating an alternate embodiment of the invention.

FIG. 7 shows a portion of a table 50 illustrating an alternate embodiment of the invention. As in FIGS. 4-6, the portion of a table 50 has a cell 51 containing a plurality of entities with a pointer 52 hovering over the cell 51 and a tooltip 53 open to display entities in the cell 51. The tooltip 53 shows a total number of entities 54 and the tooltip is enabled to not disappear when a user moves the pointer 52 such that the pointer 52 no longer hovers over the cell display. The tooltip 53 displays three sub-groups 55, 56, 57 with the middle sub-group 56 being adapted to show different entities based on the relative horizontal position of the pointer 52 in the cell 51. The entity listing of the cell 51 in FIG. 7 is sorted. The entities are arranged in the entity listing in an alphabetical order.

Unlike the embodiment of FIGS. 4-6, the exemplary embodiments shown in FIG. 7 further comprises navigation points 61, 62, 63, 64, 65, 66 in the tooltip 53 to assist a user in navigating among the entities of the cell 51. The navigation points 61, 62, 63, 64, 65, 66 in FIG. 7 comprise letters corresponding to positions in the entity listing. For example, navigation point 63 corresponds to the letter "l." As shown in FIG. 7, by a user positioning the pointer 52 over the "l" in navigation point 63, the middle sub-group 56 will show at least the first entity in the entity listing that begins with the letter "l."

Alternate embodiments may utilize different navigation points. The navigation points may vary with respect to types, numbers, positions, placements and/or styles, as non-limiting examples. Although shown in FIG. 7 with reference to an alphabetically-sorted entity listing, in other embodiments navigation points may be utilized in conjunction with other sorted and unsorted entity listings. As a non-limiting example, navigation points may be shown for an unsorted list such that the navigation points reflect the relative arrangement of the entities in the entity listing. Other exemplary embodiments may allow a user to selectively enable or disable the navigation features. Alternate exemplary embodiments may distinguish the specific navigation point a user has selected. As a non-limiting example, a particular letter navigation point selected by a user in an alphabetical navigation point system may be bolded to distinguish it from the other, unselected navigation points.

Another alternate embodiment of the invention enables a user to convert the tooltip into a separate object so that the tooltip can be moved elsewhere on the display. A non-limiting example would be enabling this functionality by allowing a user to click in the tooltip and drag it off to another part of the desktop. The tooltip could be converted into a note object (e.g. a sticky note), as a non-limiting example. Other alternate embodiments provide additional functionality, interactivity or viewing capability with the separate object. As a non-limiting example, the separate object may be a new toolbar larger in size than the original tooltip and/or comprising scroll bars and arrows to enable a user to more easily view all of the entities in the cell.

Figure 8:
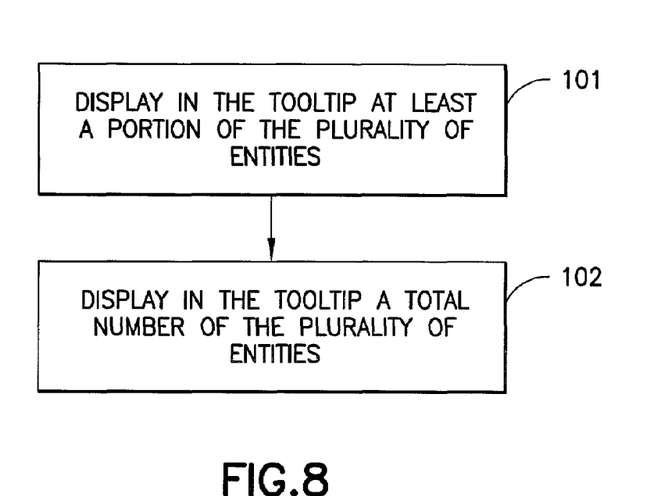
FIG. 8 shows a flow chart illustrating one non-limiting example of a method for practicing the exemplary embodiments of the invention.

FIG. 8 shows a flow chart illustrating one non-limiting example of a method for practicing the exemplary embodiments of the invention. The method enables a user to easily view, in a tooltip, all or a portion of the entities contained in a cell when the width of the cell prevents the cell display from showing all of the entities. The method of FIG. 8 includes the following steps. In box 101, in response to a tooltip being opened for a cell of a table, the cell having a plurality of entities, the method displays in the tooltip at least a portion of the plurality of entities. The at least a portion of the plurality of entities displayed in the tooltip may comprise a portion of an entity, a whole entity, more than one entity, one whole entity and a portion of another entity, or all of the plurality of entities, as non-limiting examples. In box 102, a total number of the plurality of entities is displayed in the tooltip. Alternate embodiments of the method may include options for a user relating to the tooltip display. Other alternate embodiments may incorporate various navigation features and/or navigation aids as discussed above with respect to FIGS. 4-7.

Figure 9A:
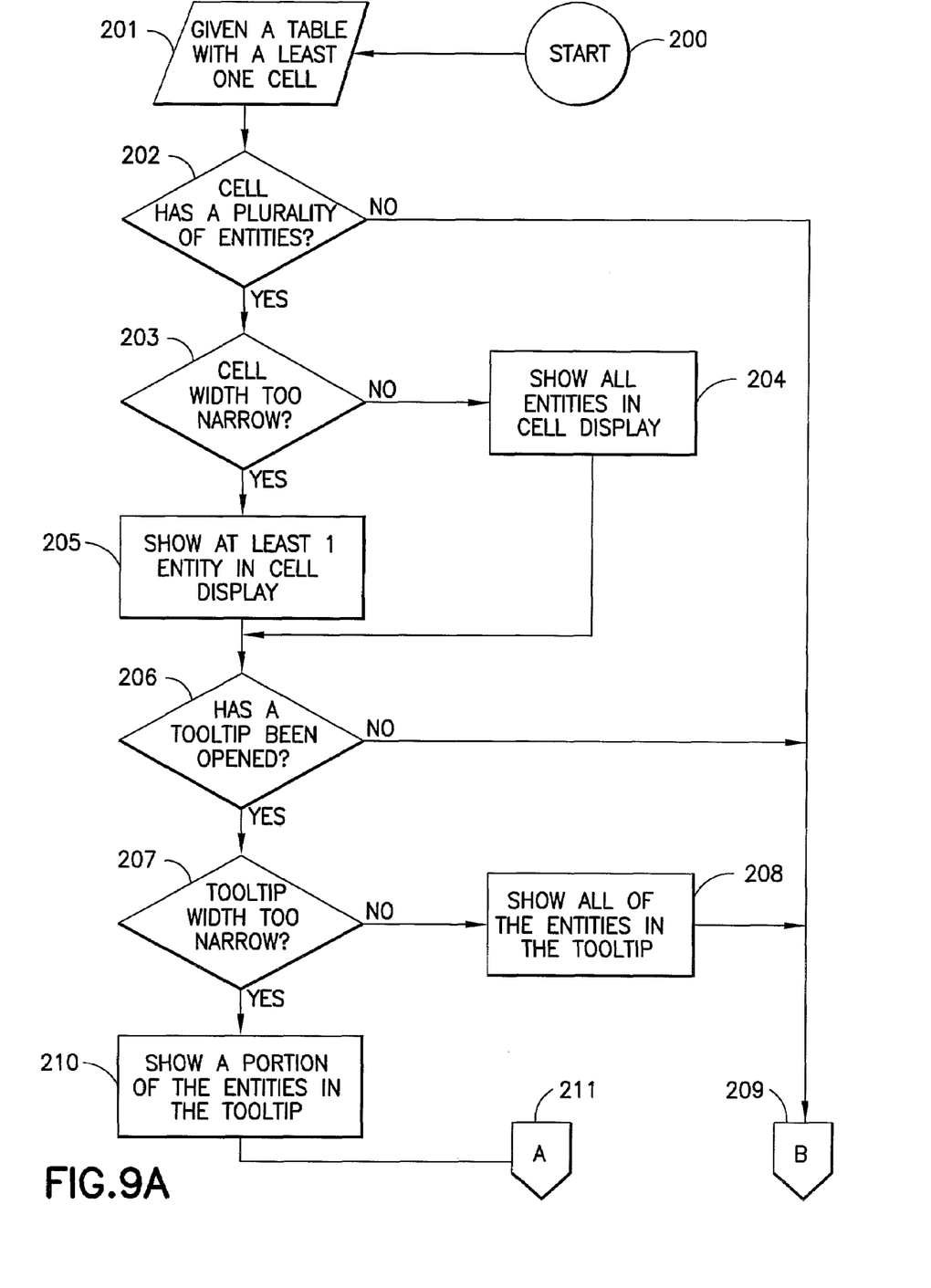
FIGS. 9A and 9B depict a flow chart illustrating an alternate exemplary method for practicing the exemplary embodiments of the invention.
Figure 9B:
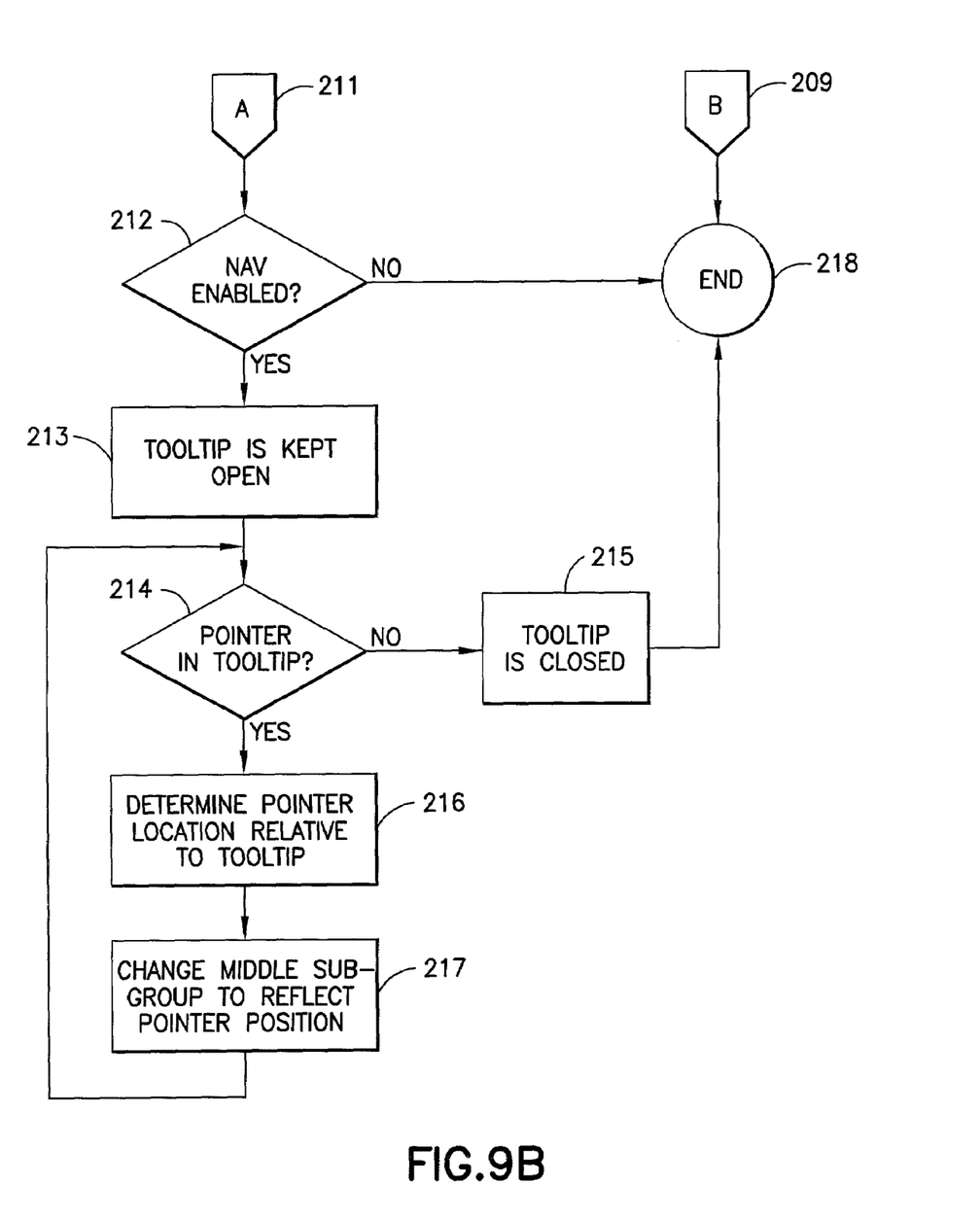

FIGS. 9A and 9B depict a flow chart illustrating an alternate exemplary method for practicing the exemplary embodiments of the invention. The method shown in FIGS. 9A and 9B may be used to enable a user to easily view, in a tooltip, all or a portion of the entities contained in a cell when the width of the cell prevents the cell display from showing all of the entities. In addition, the method shown in FIGS. 9A and 9B incorporates a selective navigation feature (NAV) similar to the one shown in the embodiment of FIGS. 4-6. Alternate embodiments may not include a navigation feature or may include a different navigation feature. Furthermore, the method shown in FIGS. 9A and 9B keeps the tooltip open (e.g. showing on the display) as long as the pointer is located within the tooltip. Alternate embodiments may either not keep the tooltip open or may keep the tooltip open based on a different action. As a non-limiting example, the tooltip may be kept open until the user presses the escape ("Esc") key on their keyboard. As used herein to describe FIGS. 9A and 9B, "the entities" refers to the plurality of entities contained in the cell.

The exemplary method of FIGS. 9A and 9B comprises the following steps, beginning with Start box 200 in FIG. 9A. In box 201, a table is provided having at least one cell. In decision box 202, the method inquires whether the cell contains a plurality of entities. If the cell does not contain a plurality of entities, the method proceeds to connector box 209 (B) which leads to End box 218 in FIG. 9B. If the cell contains a plurality of entities, the method continues to decision box 203. In decision box 203, the method inquires whether the cell width is too narrow to show all of the entities in the cell display. If the cell width is not too narrow, the method proceeds to box 204 and shows all of the entities in the cell display. From box 204, the method moves to decision box 206. If the cell width is too narrow, the method continues to box 205 and shows at least a portion of one entity in the cell display. From box 205, the method proceeds to decision box 206. In decision box 206, the method inquires whether a tooltip has been opened. If a tooltip has not been opened, the method proceeds to connector box 209 (B) which leads to FIG. 9B. In FIG. 9B, connector box 209 (B) leads to End box 218. In FIG. 9A, if a tooltip has been opened, the method proceeds from decision box 206 to decision box 207. In decision box 207, the method inquires whether the width of the tooltip is too narrow to show all of the entities in the tooltip. If the tooltip is not too narrow, the method moves to box 208 where it shows all of the entities in the tooltip. From box 208, the method proceeds to connector box 209(B), leading to End box 218 in FIG. 9B. If the tooltip is too narrow, the method continues to box 210 and shows a portion of the entities in the tooltip. In this exemplary embodiment, the portion shown is displayed in three sub-groups consisting of a left, middle and right sub-group in similar positions as the ones shown in FIG. 5. The method then proceeds to connector box 211 (A) which leads to FIG. 9B.

Continuing from connector box 211 (A) in FIG. 9B, the method reaches decision box 212. There the method inquires whether the selective navigation feature (NAV) is enabled. If NAV is disabled, the method proceeds to End box 218. If NAV is enabled, the method continues to box 213 and the tooltip is kept open. The method then moves to decision box 214 and inquires whether the pointer is located within the tooltip. If the pointer is not located within the tooltip, the tooltip is closed in box 215. From box 215, the method proceeds to End box 218. If the pointer is located within the tooltip, the method continues to box 216 and determines the horizontal location of the pointer relative to the tooltip. Based on the relative location of the pointer, in box 217 the method changes the middle sub-group to show the respective portion of the entities. The method then returns to decision box 214 to check whether the pointer is still located within the tooltip. In such a manner, the middle sub-group will continue to be updated to show the relevant portion of the entities based on the position of the pointer until the pointer is no longer located within the tooltip.

Figure 10:
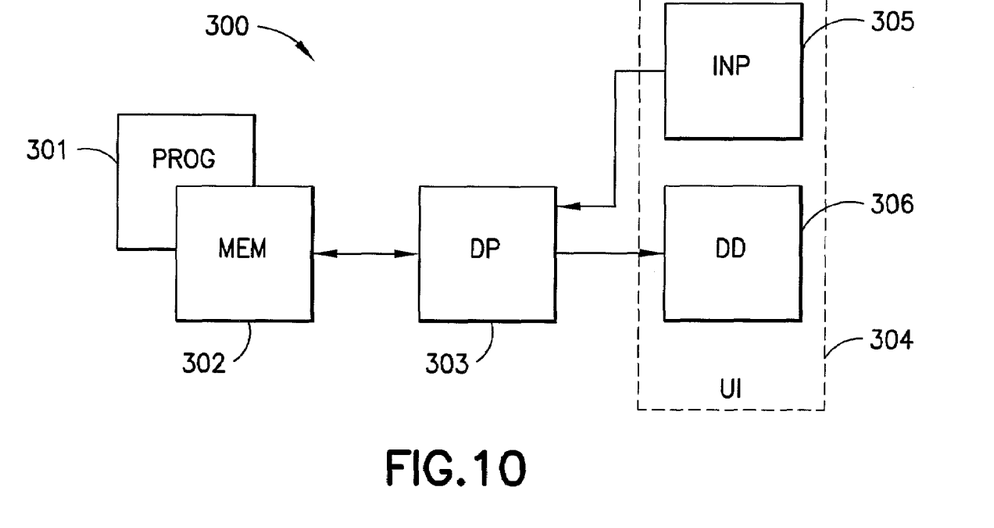
FIG. 10 illustrates a simplified block diagram of an electronic device that is suitable for use in practicing the exemplary embodiments of this invention.

Reference is made to FIG. 10 for illustrating a simplified block diagram of an electronic device, such as a computer, that is suitable for use in practicing the exemplary embodiments of this invention. In FIG. 10, the electronic device 300 includes a memory (MEM) 302 that stores program code (PROG) 301, a data processor (DP) 303, and a user interface (UI) 304 comprising at least one input device (INP) 305 and at least one display device (DD) 306. The PROG 301 is assumed to include program instructions that, when executed by the DP 303, enable the electronic device 300 to operate in accordance with the exemplary embodiments of this invention, as discussed above in greater detail.

Exemplary embodiments of the invention can take the form of an entirely hardware embodiment, an entirely software embodiment or an embodiment containing both hardware and software elements. In a typical embodiment, the invention is implemented in software, which includes but is not limited to firmware, resident software and/or microcode, as non-limiting examples.

Furthermore, exemplary embodiments of the invention can take the form of a computer program product accessible from a computer-useable or computer-readable medium providing program code for use by or in connection with a computer or any instruction execution system. For the purposes of this description, a computer-useable or computer-readable medium can be any apparatus that can contain, store, communicate, propagate, or transport the program for use by or in connection with the instruction execution system, apparatus, or device.

The medium can be electronic, magnetic, optical, electromagnetic, infrared, a semiconductor system (or apparatus or device) or a propagation medium, as non-limiting examples. Non-limiting examples of a computer-readable medium include a semiconductor or solid state memory, magnetic tape, a removable computer diskette, a random access memory (RAM), a read-only memory (ROM), a rigid magnetic disk and an optical disk. Current, non-limiting examples of optical disks include compact disk-read only memory (CR-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or indirectly through intervening I/O controllers.

Network adapters may also be coupled to the system to enable the data processing system to become coupled to other data processing systems or remote printers or storage devices through intervening private or public networks. Modems, cable modem and Ethernet cards are just a few non-limiting examples of the currently available types of network adapters.

Figure 11:
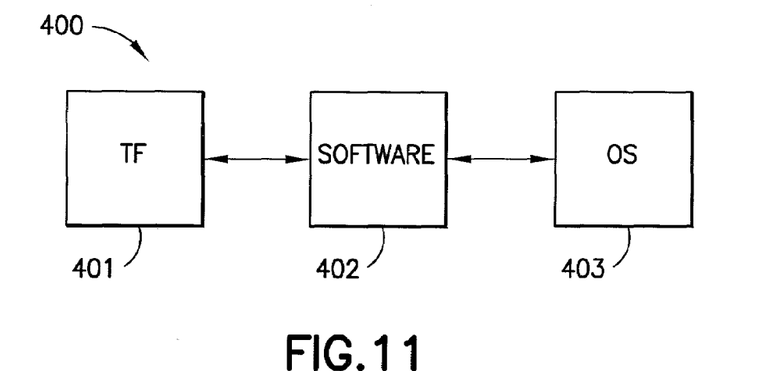
FIG. 11 shows an exemplary set of software interactions involved in implementing various embodiments of the invention.
Figure 12:
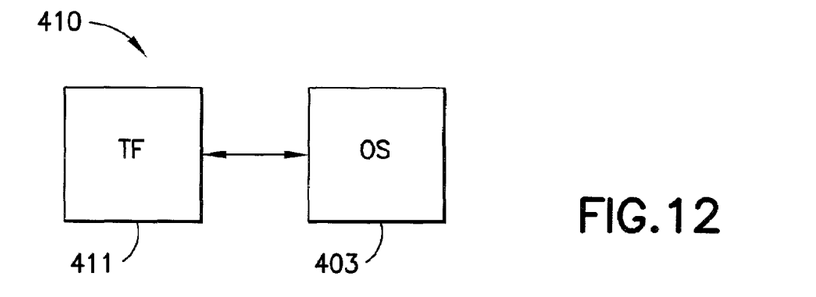
FIG. 12 shows an alternate exemplary set of software interactions involved in implementing various embodiments of the invention.

Turning now to FIGS. 11 and 12, simplified block diagrams are presented showing exemplary sets of software interactions involved in implementing various embodiments of the invention. FIG. 11 illustrates an exemplary embodiment of a set of software interactions 400 wherein a table function (TF) 401, in accordance with exemplary embodiments of the invention, interacts with Software 402 to enable a user to easily view, in a tooltip, all of the entities of a plurality of entities contained in a cell of a table when the width of the cell prevents the cell display from showing all of the entities. The Software 402 is assumed to include techniques for displaying a table and accompanying cell with the display being affected (e.g. controlled), at least in some portion, by the TF 401. The Software 402 additionally interacts with an operating system (OS) 403, in accord with technology and systems known in the art.

FIG. 12 presents a set of software interaotions 410 similar to the one shown in FIG. 11. Also shown is another table function (TF) 411, in accordance with exemplary embodiments of the invention. In the set of software interactions 410 of FIG. 12, the Software component has been subsumed by one of the other components. Either the TF 411 or the OS 403 is assumed to include techniques for displaying a table and accompanying cell with the display being affected (e.g. controlled), at least in some portion, by the TF 411. In such a manner, the TF 411 may operate in accord with table software aspects provided by the OS 403. In an alternate embodiment, the TF 411 may itself provide the table software aspects required for it to operate. A non-limiting example of this embodiment is the TF comprising table software that includes elements performing the functions of the TF.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A computer-readable memory that stores program instructions, execution of the program instructions resulting in operations comprising:
in response to a tooltip being opened for a cell of a table, the cell comprising a plurality of entities, displaying in the tooltip at least a portion of the plurality of entities;
displaying in the tooltip an indicia expressive of a total number of the plurality of entities;
providing at least one navigation aid to assist a user in navigating among the at least a portion of the plurality of entities displayed in the tooltip, wherein the at least one navigation aid comprises at least one navigation point consisting of an alphabetical letter, wherein the plurality of entities in the cell are arranged alphabetically; and
in response to selection of the at least one navigation point, displaying in the tooltip at least one entity corresponding to the at least one navigation point.

2. The computer-readable memory of claim 1, wherein displaying in the tooltip the at least one entity comprises displaying at least a portion of the plurality of entities up to a predetermined number of entities.

3. The computer-readable memory of claim 1, wherein displaying in the tooltip the at least one entity comprises displaying at least a portion of the plurality of entities up to a predetermined number of characters.

4. The computer-readable memory of claim 1, wherein the tooltip is opened in response to an interaction between a pointer and the cell and wherein the tooltip remains open while the pointer is located within the tooltip.

5. The computer-readable memory of claim 1, wherein execution of the program instructions results in operations further comprising providing a user with an option to selectively enable or disable the at least one navigation aid.

6. The computer-readable memory of claim 1, wherein execution of the program instructions results in operations further comprising enabling a user to convert the tooltip into a separate object that is movable within a display screen.

7. An electronic device comprising:
at least one memory; and
at least one data processor coupled to the at least one memory, wherein the at least one data processor is operable to perform operations comprising:
in response to a tooltip being opened for a cell of a table, the cell comprising a plurality of entities, displaying in the tooltip at least a portion of the plurality of entities;
providing at least one navigation aid to assist a user in navigating among the at least a portion of the plurality of entities displayed in the tooltip, wherein the at least one navigation aid comprises at least one navigation point consisting of an alphabetical letter, wherein the plurality of entities in the cell are arranged alphabetically; and
in response to selection of the at least one navigation point, displaying in the tooltip at least one entity corresponding to the at least one navigation point.

8. The electronic device of claim 7, wherein the set of operations further comprises providing a user with an option to selectively enable or disable the at least one navigation aid.

9. The electronic device of claim 7, wherein the set of operations further comprises enabling a user to convert the tooltip into a separate movable object.

10. A computer-readable memory that stores program instructions, execution of the program instructions resulting in operations comprising:
in response to a tooltip being opened for a cell of a table, the cell comprising a plurality of entities, displaying in the tooltip at least a portion of the plurality of entities;
providing at least one navigation aid to assist a user in navigating among the at least a portion of the plurality of entities displayed in the tooltip, wherein the at least one navigation aid comprises at least one navigation point consisting of an alphabetical letter, wherein the plurality of entities in the cell are arranged alphabetically; and
in response to selection of the at least one navigation point, displaying in the tooltip at least one entity corresponding to the at least one navigation point.

11. The computer-readable memory of claim 10, wherein execution of the program instructions results in operations further comprising providing a user with an option to selectively enable or disable the at least one navigation aid.

12. The computer-readable memory of claim 10, wherein the at least one navigation point comprises a plurality of navigation points and wherein a user-selected navigation point is distinguished from unselected navigation points, where each navigation point corresponds to at least one entity or group of entities in the cell, and wherein the user-selected navigation point controls the corresponding at least one entity or group of entities being displayed.

13. The computer-readable memory of claim 10, wherein the displayed at least one entity has a name that begins with the same letter as the alphabetical letter of the at least one navigation point.

14. The electronic device of claim 7, wherein the at least one navigation point comprises a plurality of navigation points and wherein a user-selected navigation point is distinguished from unselected navigation points, where each navigation point corresponds to at least one entity or group of entities in the cell, and wherein the user-selected navigation point controls the corresponding at least one entity or group of entities being displayed.

15. The electronic device of claim 7, wherein the displayed at least one entity has a name that begins with the same letter as the alphabetical letter of the at least one navigation point.

16. The electronic device of claim 7, wherein the at least one data processor is operable to perform further operations comprising: displaying in the tooltip an indicia expressive of a total number of the plurality of entities.

* * * * *